(12) United States Patent
Hudgins et al.

(10) Patent No.: US 7,853,150 B2
(45) Date of Patent: Dec. 14, 2010

(54) IDENTIFICATION AND AUTHORIZATION OF OPTOELECTRONIC MODULES BY HOST SYSTEM

(75) Inventors: Clay E. Hudgins, Edgewood, NM (US); Daniel McGlynn, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 917 days.

(21) Appl. No.: 11/620,317

(22) Filed: Jan. 5, 2007

(65) Prior Publication Data

US 2008/0166131 A1    Jul. 10, 2008

(51) Int. Cl.
*H04B 10/00* (2006.01)
(52) U.S. Cl. .................. 398/135; 398/139; 398/136; 398/9; 398/164; 398/33; 385/88; 385/89; 385/90; 385/92; 385/93
(58) Field of Classification Search .............. 398/135, 398/136, 128, 130, 138, 139, 137, 158, 159, 398/164, 115, 116, 117, 118, 33, 9, 10, 17, 398/22, 23, 24, 182, 183, 192, 200, 202, 398/208, 209, 195; 385/88, 89, 90, 92, 93
See application file for complete search history.

(56) References Cited

U.S. PATENT DOCUMENTS

| 6,912,361 | B2* | 6/2005 | Aronson et al. ............. 398/135 |
|---|---|---|---|
| 6,941,077 | B2 | 9/2005 | Aronson et al. |
| 6,952,531 | B2 | 10/2005 | Aronson et al. |
| 6,957,021 | B2 | 10/2005 | Aronson et al. |
| 6,971,016 | B1 | 11/2005 | Barnett |
| 7,050,720 | B2 | 5/2006 | Aronson et al. |
| 7,058,310 | B2 | 6/2006 | Aronson et al. |
| 7,079,775 | B2 | 7/2006 | Aronson et al. |
| 7,149,430 | B2 | 12/2006 | Hosking et al. |
| 7,162,160 | B2 | 1/2007 | Aronson et al. |
| 7,184,668 | B2 | 2/2007 | Aronson et al. |
| 7,200,337 | B2 | 4/2007 | Hosking et al. |
| 7,302,186 | B2 | 11/2007 | Light et al. |
| 7,346,278 | B2 | 3/2008 | Aronson et al. |
| 7,623,784 | B1* | 11/2009 | Pan et al. ................. 398/58 |
| 2002/0018568 | A1 | 2/2002 | Weaver, III et al. |
| 2002/0099942 | A1 | 7/2002 | Gohl |
| 2002/0162023 | A1 | 10/2002 | Audebert et al. |
| 2003/0053170 | A1* | 3/2003 | Levinson et al. ............. 359/152 |

(Continued)

FOREIGN PATENT DOCUMENTS

EP    0597501    5/1994

(Continued)

*Primary Examiner*—Hanh Phan

(57) ABSTRACT

An optoelectronic module for converting and coupling an information-containing electrical signal with an optical fiber including a housing having an electrical input for detachably coupling with an external cable or information system device and for transmitting and receiving information-containing electrical signals over such input, and a fiber optic connector adapted for coupling with an external optical fiber for transmitting and receiving an optical signal; an electro-optic subassembly coupled to the information containing electrical signal and converting it to and/or from a modulated optical signal corresponding to the electrical signal; a memory disposed in said housing for storing an encrypted identifier; and a communication interface disposed in said housing for electrically transferring the data to an external device when the module is authenticated using the encrypted identifier, to enable operation of the module.

14 Claims, 7 Drawing Sheets

U.S. PATENT DOCUMENTS

| | | |
|---|---|---|
| 2003/0128411 A1* | 7/2003 | Aronson et al. ............. 359/152 |
| 2004/0136708 A1* | 7/2004 | Woolf et al. ................. 398/22 |
| 2004/0136720 A1 | 7/2004 | Mahowald et al. |
| 2004/0179521 A1 | 9/2004 | Kim et al. |
| 2004/0197101 A1 | 10/2004 | Sasser et al. |
| 2005/0049976 A1 | 3/2005 | Yang |
| 2005/0196111 A1 | 9/2005 | Burdick et al. |
| 2006/0033811 A1 | 2/2006 | Pulitzer |
| 2006/0155855 A1 | 7/2006 | Hamai |
| 2007/0092257 A1* | 4/2007 | Smith et al. ................. 398/135 |
| 2007/0092258 A1* | 4/2007 | Nelson ....................... 398/135 |
| 2007/0140690 A1 | 6/2007 | Aronson et al. |
| 2007/0263713 A1 | 11/2007 | Aronson |
| 2008/0298810 A1* | 12/2008 | Crosby et al. ............... 398/135 |

FOREIGN PATENT DOCUMENTS

| | | |
|---|---|---|
| EP | 0786884 | 7/1997 |
| GB | 2369020 | 5/2002 |
| GB | 2392068 | 2/2004 |
| GB | 2397478 | 7/2004 |
| WO | WO 95/20279 | 7/1995 |
| WO | WO 97/49217 | 12/1997 |
| WO | WO 99/21336 | 4/1999 |
| WO | WO 03/079635 | 9/2003 |
| WO | WO 2005/114945 | 12/2005 |
| WO | WO 2005/119945 | 12/2005 |
| WO | WO 2006/040238 | 4/2006 |

* cited by examiner

IDENTIFICATION AND AUTHORIZATION OF OPTOELECTRONIC MODULES BY HOST SYSTEM

REFERENCE TO RELATED APPLICATIONS

This application is related to U.S. patent application Ser. No. 11/499,120 filed Aug. 4, 2006 assigned to the common assignee.

BACKGROUND OF THE INVENTION

1. Field of the Invention

The invention relates to optical communications devices, such as transmitters, receivers, and transceivers used in high throughput fiber optic communications links in local and wide area networks and storage networks and in particular to parametric monitoring of the performance of such devices in the host system or by a system manager.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal, and similar implementations employ one fiber for both optical signals, traveling in opposite directions. The electrical signals are transferred in both directions over an electrical connectors that interface with the network unit using a standard electrical data link protocol.

The optical transmitter section includes one or more semiconductor lasers and an optical assembly to focus or direct the light from the lasers into an optical fiber, which in turn, is connected to a receptacle or connector on the transceiver to allow an external optical fiber to be connected thereto using a standard connector, such as SC, FC or LC. The semiconductor lasers are typically packaged in a hermetically sealed can or similar housing in order to protect the laser from humidity or other harsh environmental conditions. The semiconductor laser chip is typically a distributed feedback (DFB) laser with dimensions a few hundred microns to a couple of millimeters wide and 100-500 microns thick. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which in turn, is connected to a transimpedance amplifier/limiter circuit on a circuit board. The photodetector or photodiode it typically packaged in a hermetically sealed package in order to protect it from harsh environmental conditions. The photodiodes are semiconductor chips that are typically a few hundred microns to a couple of millimeters wide and 100-500 microns thick. The package in which they are mounted is typically from three to six millimeters in diameter, and two to five millimeters tall and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), XFP ("10 Gigabit Small Form Factor Pluggable", see www.XFPM-SA.org), and the 300-pin module (see www.300pinmsa.org).

Customers and users of such modules are interested in small or miniaturized transceivers in order to increase the number of interconnections or port density associated with the network unit, such as, for example in rack mounted line cards, switch boxes, cabling patch panels, wiring closets, and computer I/O interfaces.

The identification of individual modules in connection with assessing reliability of such modules is an important consideration network management. When a module degrades or fails, users must reconfigure the system to bypass the inoperative module. Moreover, performance degradation must be understood as an essential step in preventing recurrence of that failure. Thus, producers of optical modules expend much effort in failure analysis to determine the root cause of any failures that occur and to subsequently improve products to eliminate similar failures in the future. Such failure analysis is after the fact, and very labor intensive, requiring technologists referred to as reliability analysts. Such failure analysis often requires an extensive suite of test equipment, which also represents a significant expense to the manufacturer.

The failure analysis process is relatively expensive to the manufacturer, and consequently the producer has an interest in conducting the analysis as efficiently as possible such as when the module is still installed in the system. Additionally, sometimes the failure is covered by a warranty, and honoring the warranty represents an expense to the manufacturer.

If more information regarding the operational history of the optical module could be made available during a real time basis, then determining the warranty status would be made more straightforward, and aspects of the failure analysis would be simpler. Failure analysis involves a search for information about the causes and circumstances of product failure, often by exploiting very subtle clues, and any information that can be made explicitly available to the reliability analyst has the potential to make their task more productive, effective, and efficient.

This concept of module data analysis is extendable to cases in which no failure has occurred. In this case, a reliability analyst may analyze a used optical module to observe parametric shifts in performance, and the information gained may be used to define design and manufacturing process improvements to make the product even more reliable in the future. Because of the importance of reducing failures and parametric shifts in product performance, a need exists for better methods of tracking operational performance of optical modules by a network management system.

Various techniques to control access to a network by a terminal or user are well known in the prior art, the simplest of which include passwords, serial numbers or use IDs, PIN codes, and dedicated hardware with cryptographic keys. Such prior art is usually directed to preventing network access by an unauthorized user. In the context of the present invention, the concern which has led to the present invention is not an unauthorized user but an unauthorized or counterfeit module. Stated another way, in a commercial environment in which network units or components such as optoelectronic modules or transceivers are standardized in form, fit, and function, it is useful for the host equipment vendor or network manager to have a mechanism to ensure that only network units or components from certain approved suppliers, or having certain predefined operational, reliability, or quality of service characteristics, are only utilized in the network, and that "generic" units, or units not meeting certain operational characteristics are electronically rejected and denied access or use in the network.

Identification information, such as transceiver type, capability, serial number, compatibility information may be stored, or be capable of being stored, in a transceiver (see, for example, U.S. Patent Application Publication 2003/0128411). Prior to the present invention such information has not been utilized in the context of authorizing use of a particular module in a host unit or network into which it has been plugged, or for monitoring or assessing reliability of such modules during real time operation.

Prior to the present invention, it had not been possible for a data communications network to detect the presence of unauthorized network units or a component's capability or access to such network.

SUMMARY OF THE INVENTION

1. Objects of the Invention

It is an object of the present invention to provide an optoelectronic module in a small pluggable standardized form factor with embedded parametric monitoring and collection in the module, and a parametric processor in the host system.

It is also another object of the present invention to provide a module for use in an optical fiber transmission system with means for collecting total elapsed operating time, temperature, temperature change, and data transmission error rate, and automatically externally communicating such data to a network management unit.

It is still another object of the present invention to provide an optical transceiver with a means for collecting and transmitting environmental and operational data at periodic time intervals to an external network manager.

It is still another object of the present invention to provide a feature in an optoelectronic module for transmitting alerts of excursions from normal environmental and operational conditions to an external network manager.

It is another object of the present invention to provide an optical transceiver for use in an optical transmission system with electrical and mechanical sensors to detect and externally communicate the existence of report abnormal operating conditions.

It is still another object of the present invention to provide an optoelectronic module in a small pluggable standardized form factor with embedded identification and authorization data.

It is also another object of the present invention to provide a module for use in an optical fiber transmission system with means for authenticating the module when plugged into a host unit connected to a network.

It is still another object of the present invention to provide an optical transceiver with a means for communicating with a network manager when plugged into a host unit for verifying and authorizing use of such module.

It is still another object of the present invention to provide a feature in an network operating system receiving alerts of excursions from normal environmental and operational conditions from pluggable transceiver modules.

It is also another object of the present invention to provide an optical transceiver for use in an optical transmission system with tamper proof identification devices and externally communicate the identity and existence of such module to a network manager and to report abnormal operating conditions.

2. Features of the Invention

Briefly, and in general terms, the present invention provides an optical transceiver for converting and coupling an information-containing electrical signal from an information system device with an optical fiber including a housing including an electrical connector for coupling with an external electrical cable or information system device and a fiber optic connector adapted for coupling with an external optical fiber, at least one electro-optical subassembly in the housing for converting between an information containing electrical signal and a modulated optical signal corresponding to the electrical signal including either a transmitter or a receiver, or both, and means in the information system device for recording environmental and/or operational data associated with the module.

Some implementations or embodiments may achieve fewer than all of the foregoing objects.

In another aspect, the present invention provides an optical transceiver for converting and coupling an information-containing electrical signal from an information system device with an optical fiber including a housing including an electrical connector for coupling with an external electrical cable or information system device and a fiber optic connector adapted for coupling with an external optical fiber, at least one electro-optical subassembly in the housing for converting between an information containing electrical signal and a modulated optical signal corresponding to the electrical signal including either a transmitter or a receiver, or both; parametric collection means in the housing for collecting operational data associated with the transmitter, and data compression means in the housing for comprising the operational data, including lossy compression intended to preserve the most important data at the expense of data of lesser importance (U.S. patent application Ser. No. 11/499,120).

In another aspect, the present invention provides a data communication network including a plurality of network units and a plurality of pluggable optoelectronic modules coupled to one or more of such network units, the modules functioning to couple the associated network unit to an optical fiber for transmitting and/or receiving optical signals over such fiber, each module having a unique electronic identifier that is selectable from a set of identifiers and is utilized by the network to activate such module when the module is plugged into the network unit, the module including a processor for detecting when a module is plugged into the network unit and transmitting the identifier to the network unit and for receiving an authorization response; and enabling operation of the module upon verification.

In another aspect, the present invention provides a data communications network including a plurality of network units and a plurality of pluggable optoelectronic modules coupled to one or more of such network units, the modules functioning to couple the associated network unit to an optical fiber for transmitting and/or receiving optical signals over such fiber, each module having a unique identifier that is selectable from a set of authorized identifiers and is utilized by the network to activate such module when the module is plugged into the network unit, including a processor on the network for detecting when a module is plugged into a network unit and acquiring the unique identifier and associated with the respective module; and an authenticator, including a database storing the set of authorized identifiers and for processing said unique identifier for determining from the database whether a module with the identifier has already been authorized to operate on the network (thus potentially indicating the existence of counterfeit modules on the network) and, if so, for declining authorization of or disabling such module.

Some implementations or embodiments may incorporate or implement fewer of the aspects or features noted in the foregoing summaries.

Additional objects, advantages, and novel features of the present invention will become apparent to those skilled in the art form this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
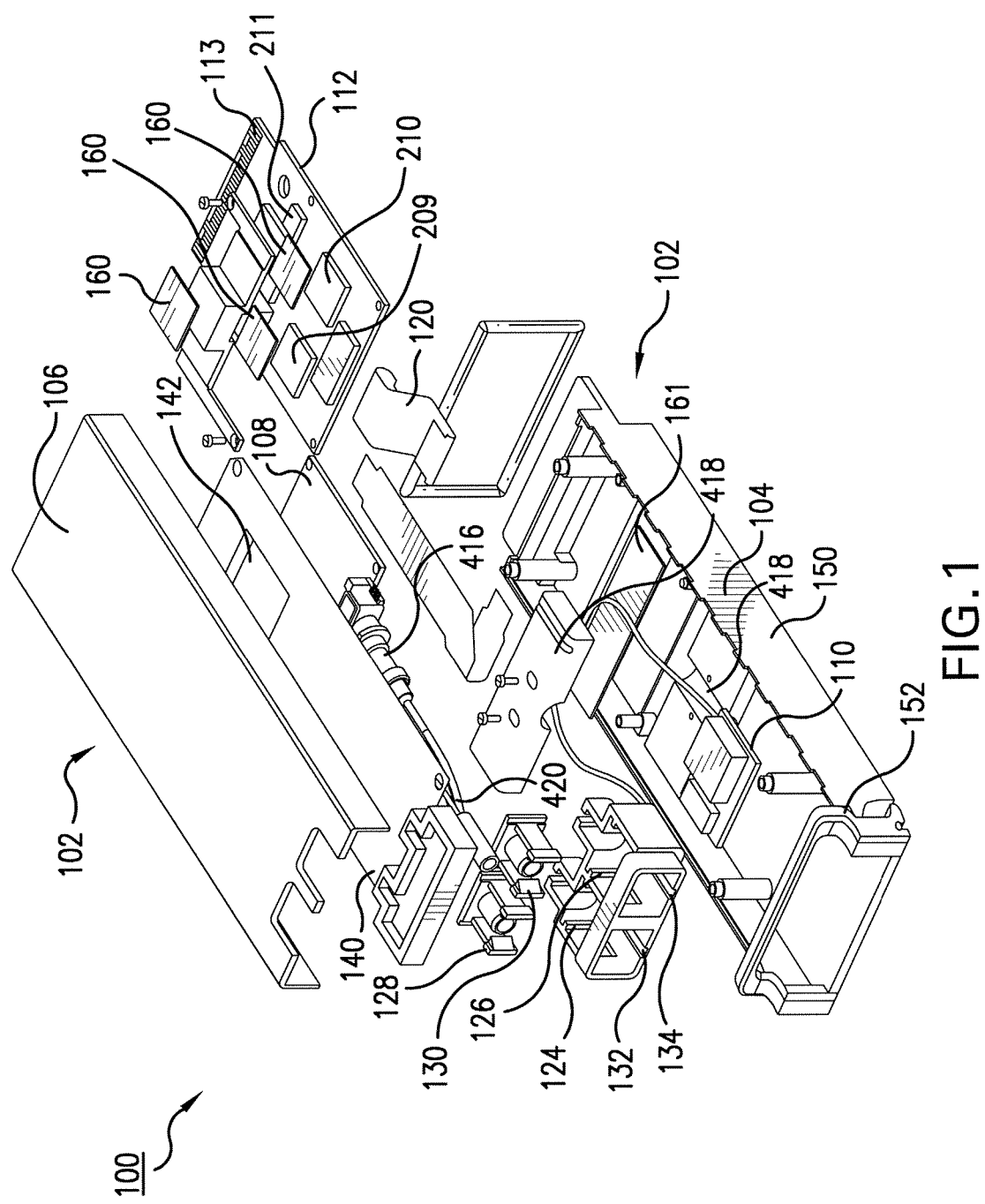
FIG. 1 is an exploded perspective view of an optoelectronic module in accordance with an illustrated embodiment of the invention.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to parametric environmental and operational monitoring of optical communications modules such as transmitters, receivers, and transceivers used in fiber optic communications systems.

Referring now to FIG. 1, there is shown an exploded view of an exemplary pluggable optical transceiver module 100 according to a preferred embodiment of the present invention. In this particular embodiment, the module 100 is compliant with the IEEE 802.3ae 10GBASE-LX4 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured in various alternate form factors such as XENPAK, X2, etc. The module 100 is preferably a 10 Gigabit Wide Wavelength Division Multiplexed (WWDM) transceiver having four 3.125 Gbps distributed feedback lasers that enable 300 meter transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes four distributed feedback (DFB) semiconductor lasers, which may be mounted in a single, hermetically sealed enclosure 415, which interfaces to a fiber coupling subassembly 416. The transmit board 108 is secured in place at the bottom of the housing using a brace 418 attached to the coupling subassembly 416. The brace also functions as a heat sink for dissipating heat from the metallic fiber coupling subassembly 416 and hermetically sealed enclosure 415. In addition, the transmit board 108 and receive board 110 are connected to the PCS/PMA board 112 by respective flex interconnects 121 and 120, or other board-to-board electrical connectors or cables. Thermally conductive gap pads may be provided to transmit the heat generated by the lasers and other components in the transmitter subassembly to the base 104 or cover 106 of the housing, both of which act as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as Flex-Plane™ available from Molex, Inc. of Lisle, Ill., although other flexible substrate may be used as well. The optical fiber 420 originating from the transmitter subassembly is thereby routed to the transmit optical connector plug 130, which is attached to the faceplate 131, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the cover 106 which acts as a heat sink, to contact a heat transmission gap pad 160, so as to provide access and a heat conductive path to the mounted components on the board 112. This area on the board 112 normally would be inaccessible if not for the opening 142. The gap pad 160 is installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment, the transceiver 100 is manufactured in a modular manner using three separate subassemblies mounted in the housing—a transmitter subassembly, a receiver subassembly, and a protocol processing board—with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside the housing.

The modern optical transceiver or module, such as that of FIG. 1, as well as those complying with the XENPAK, X2, XPAK, or 300 pin form factors, possesses underutilized resources for collecting information and nonvolatile memory in which to store it. Optical modules 100 typically employ synchronous digital circuitry, which gives them the capability to measure Elapsed Run Time (ERT) in an Elapsed Run Time Meter (ERTM) as has long been done in the field of industrial-grade internal combustion engines. The present invention implements an ERTM in a digital logic circuit 209 or other means within the housing of the module 100 for recording and storing the total operating time of the optical module without a microprocessor or alternately may implement the ERTM using a clock-counter resource within an embedded microprocessor 210, depending on the hardware resources available within the optical module.

The purpose of the ERTM within the module 100 is to count and to store the number of time units the module has run since first being built and provided to the user, and to make that information available to the producer if the user should ever return the module to the producer for warranty service, or for any other reason. For the ERTM to be useful to the producer's reliability analyst, the ERTM must by default retain the ERT value in nonvolatile memory when power is removed from the optical module. Furthermore, the ERTM must by default continue counting ERT when power is once again applied to the optical module, resuming with the previous value rather than starting over from zero. In addition to the default behaviors of the ERTM, which enable autonomous operation without intervention by the user, the producer must have a means to override default ERTM behaviors for maintenance and diagnostic purposes, including the ability to reset the ERTM to zero, to read the ERTM's value, to set the ERTM to non-zero values, and to freeze (i.e., halt or stop) and restart the ERTM.

The ERTM's demands on nonvolatile storage space within the module 100 are quite modest. For example, a one-minute resolution meter with thirty years duration may be implemented in only 24 bits of nonvolatile memory (i.e., 30 years×365.25 days/year×24 hours/day×60 minutes/hour=15,778,800 minutes. It may be noted that 15,778,800 minutes is less than the maximum value of a 24 bit register, which may represent a maximum of $2^{24}-1$, which equals 16,777,215).

In practice, the ERTM is not constrained to measure time in conventional time units (e.g., hours, minutes, seconds). The ERTM may measure elapsed time in some local timebase, which may be a convenient multiple of the period of any synchronous digital clock employed within the optical module or some multiple of the signaling period of data passing through the module. (Often optical modules recover a digital clock signal from the received pseudorandom optical data waveform.) The necessary general purpose processing to convert the ERTM's timebase to conventional time units need not be present within the optical module, since general purpose processing capability will be conveniently available to the producer's reliability analyst.

Typically, when a user decides that a module has failed, such conclusion is one from the user's viewpoint, and thus the failure will be related to some parameter of direct interest to the user, and that failure will likely not involve the ERTM, which is of only indirect interest to the user. When the user removes the optical module from operation, by unplugging it from the host unit, the optical module will no longer receive the electrical power required to operate, and so the ERTM will cease to run. And so, when the producer receives a failed module returned by the user, the ERTM will provide the total elapsed run time experienced by the module up to the point of failure, which is something that otherwise would impossible to know and difficult to estimate.

Another feature of the present invention is the data compression of data acquired in the module 100. A data compression algorithm may be implemented in software and executed on the microprocessor 210. Run length encoding is a preferred data compression technique for environmental data such as temperature which may remain substantially the same value for an extended period of time. One of the lossy data compression techniques of U.S. patent application Ser. No. 11/499,120 may be employed to retain the most recent readings and less frequent samples of the older readings. A data communications interface circuit 211 may be used to assemble the compressed data into a data packet which can be periodically transferred to the host unit. The data packet may contain the serial number of the module, the time and date of the sample, the type of sample data, and the data itself.

Figure 2:
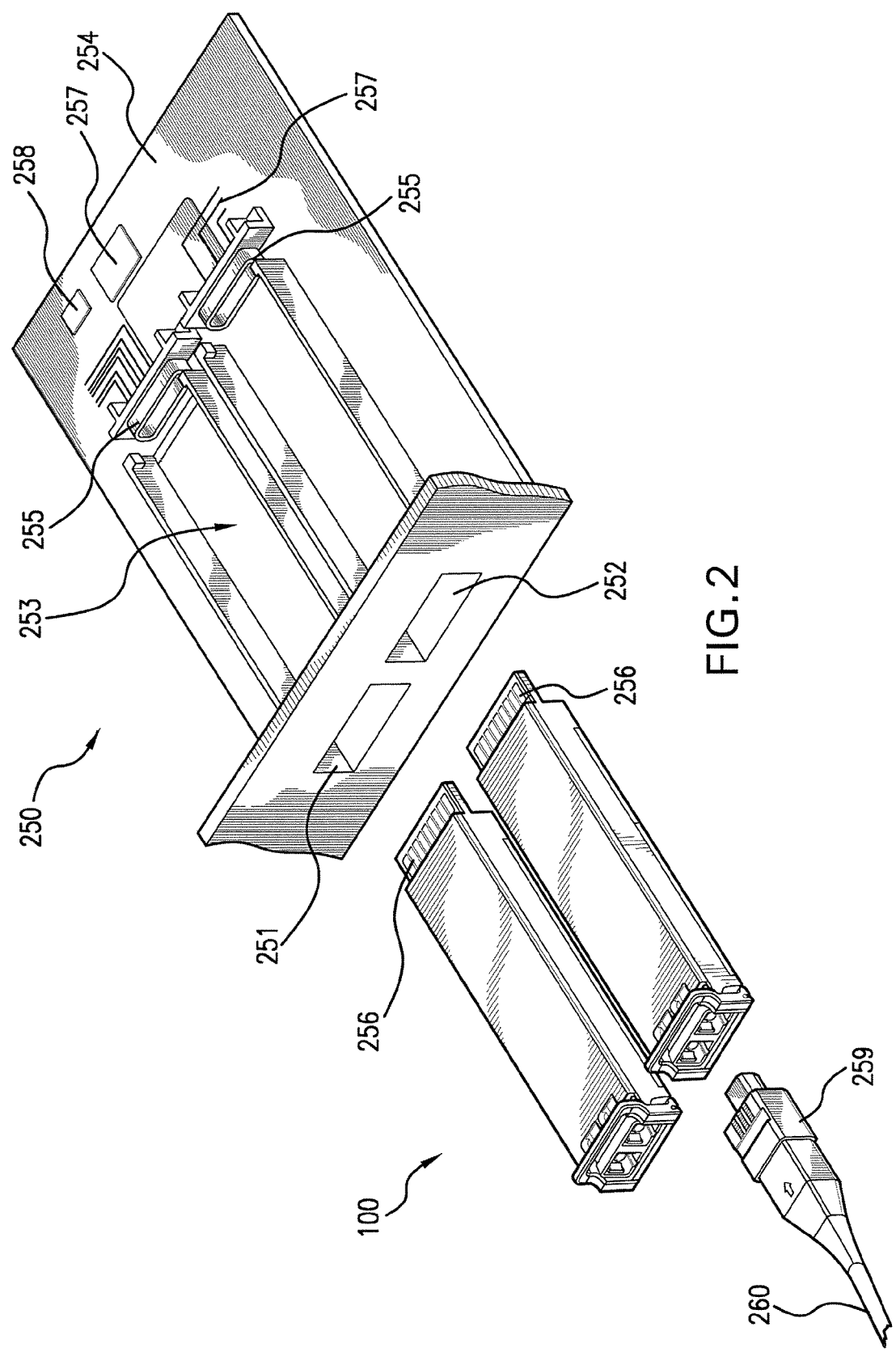
FIG. 2 is a perspective view of a module being inserted into a receptacle or cage in a host unit.

FIG. 2 is a perspective view of a module being inserted into a receptacle or cage in a host unit. The perspective view of the chassis 250 of the host unit or information system device for receiving a pluggable module according to the present invention depicts receptacles 251, 252 adapted for receiving a pluggable module 100, a cage 253 for securing the module adjacent to a printed circuit card 254, and an electrical connector 255 connected to the printed circuit card 254 and adapted for receiving the electrical connector 256 associated with the module. The printed circuit card 254 includes power and bus lines 257, a processor 258, and associated components such as memory 259. An optical cable connector 259 is employed to connect module 100 to the host optical cable plant 260.

Figure 3:
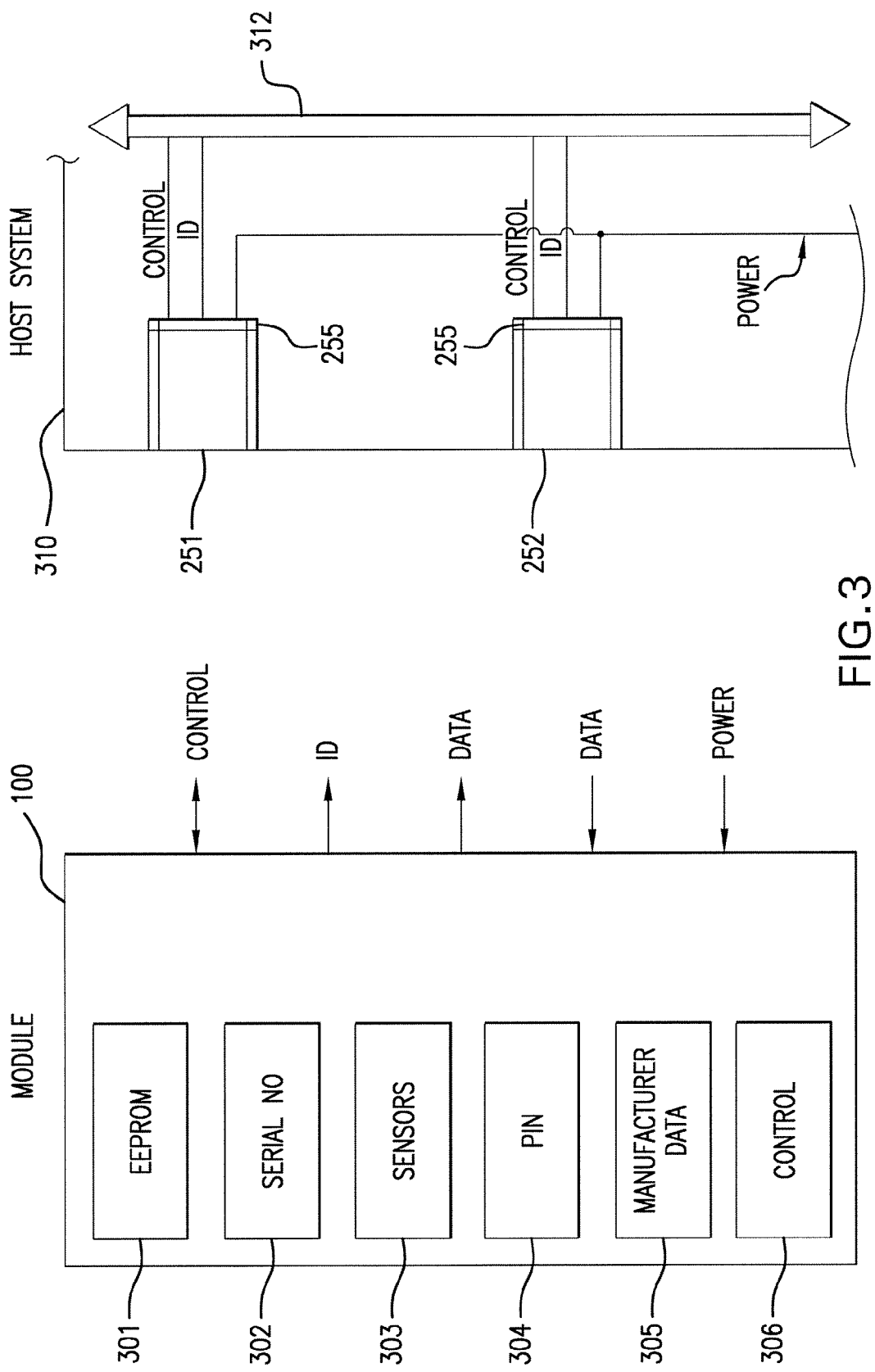
FIG. 3 is a highly simplified block diagram of certain elements of the module and the host unit.

FIG. 3 is a highly simplified block diagram of certain elements of the module 100 and the host unit 310. In particular, the module includes an EEPROM 301 for temporarily storing parametric data, a serial number ROM 302 which contains the manufacturer's serial number of the module. The sensors 303 acquire the parametric data described in connection with the designation of FIG. 1. A PIN as cryptographic key 304 is also provided, which is utilized to verify the authorization of the module, or its validity, to the host unit prior to the module being capable of operation.

Various manufacturers data, such as date of manufacture, warranty period, service record, etc. may be stored in the module memory area 305. Finally, control software 306 is provided to coordinate operation of the various stored items and controlling the communication of the stored data to the host unit 310. The host unit 310 is depicted as including a slot or receptacle 251, 252 for insertion of the module 100 with an electrical connector 255 in the rear of the case 253 for mating with the electrical connector 256 on the module 100. In this representation, there is also depicted a set of control and ID lines from each connector 255 connected to an internal bus 312 in the host unit 310. A power line (see 256) is also provided in host unit 310 which connects to each connector 255.

Figure 4:
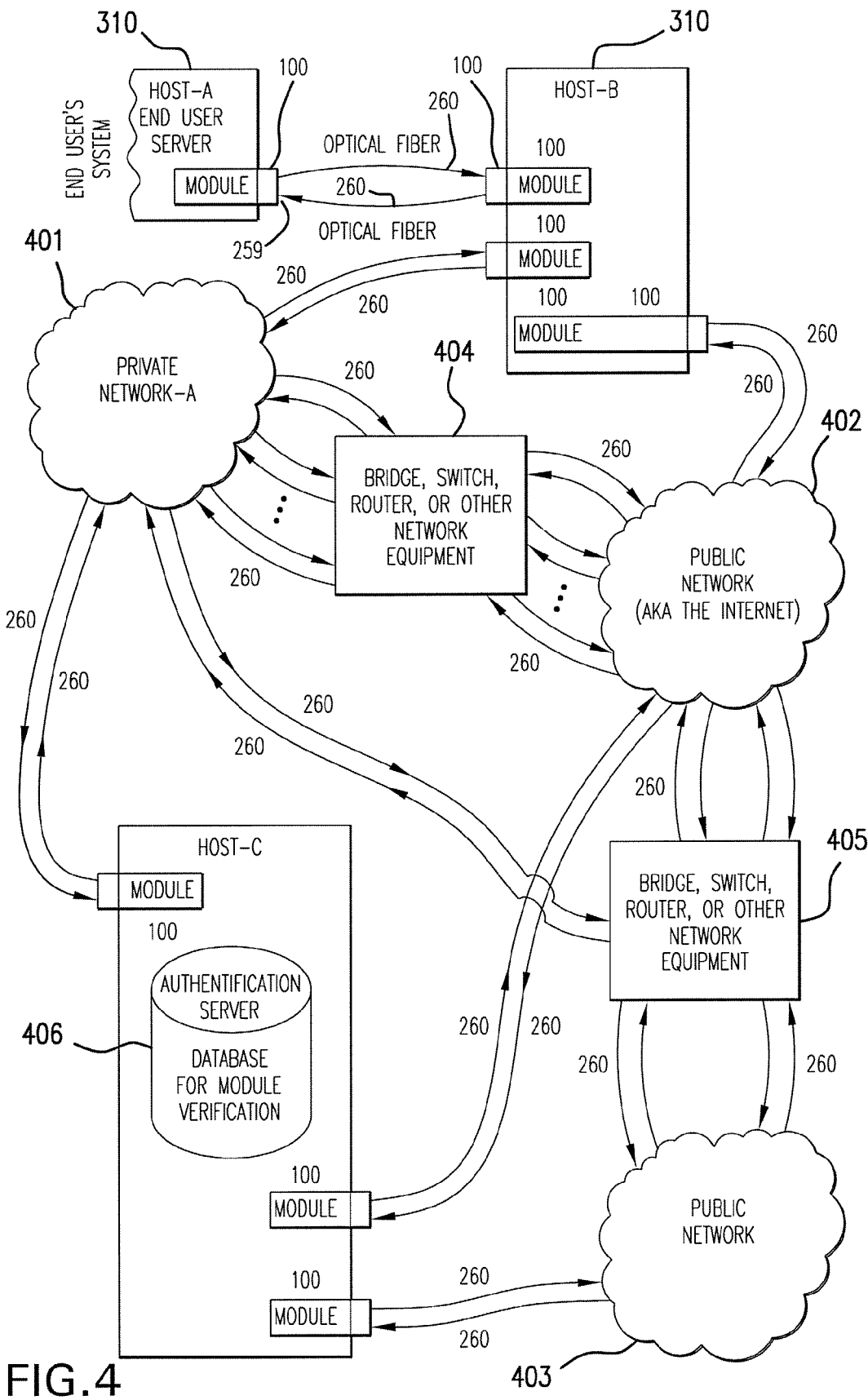
FIG. 4 is a block diagram of a host system or network including the host unit.

FIG. 4 shows a network and a possible configuration between a plurality of modules 100, hosts 310, and an authentication server 406. In some instances, the modules 100 may be on the same private network 401 as the authentication server 406. In other cases, the modules 100 may connect directly to the public network 402, such as the Internet 402.

Similarly, the authentication server may connect to the Internet 402 or one or more private networks 401, 403. When a module 100 and authentication server are on separate private networks, these private networks may be connected directly together by network equipment (bridge, router, or switch) 405.

Alternately, when the module 100 and authentication server 406 are on separate private networks 401, 403, these private networks may first connect to the Internet 402 via network equipment 404, 405 in order to form the necessary end-to-end connectivity between the module 100 and the authentication server 406.

Moreover, a plurality of authentication servers 406 may be distributed around the network for improved fault tolerance and/or improved speed of access. In the case of a plurality of authentication servers 406, these authentication servers will periodically synchronize their databases among themselves.

Figure 5:
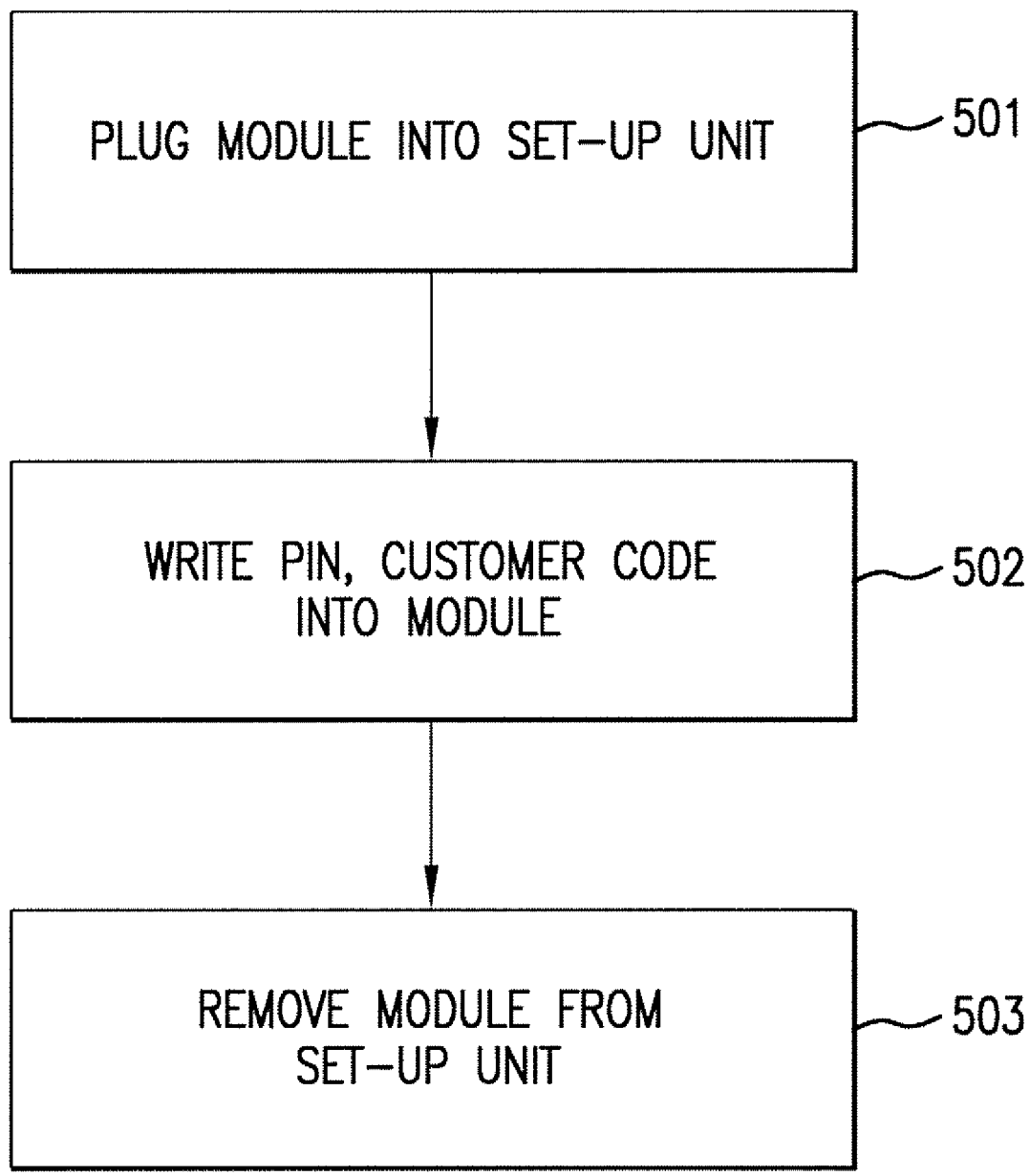
FIG. 5 is a flow chart depicting the initialization or encoding of the module during manufacture.

FIG. 5 is a flow chart depicting the initialization or encoding of the module during manufacture; in particular, at step 501, the module is plugged into a test or initialization unit, powered, and at step 502 the PIN or cryptographic key 304 is generated and written into the unit, after which the module is removed 503 from the programming setup unit. In addition to including information on this customer or class of customer equipment for which the module is authorized to be operative with, the key may crypto graphically encrypt the serial number or other manufacturer's data, such as a digital signature or watermark.

Figure 6:
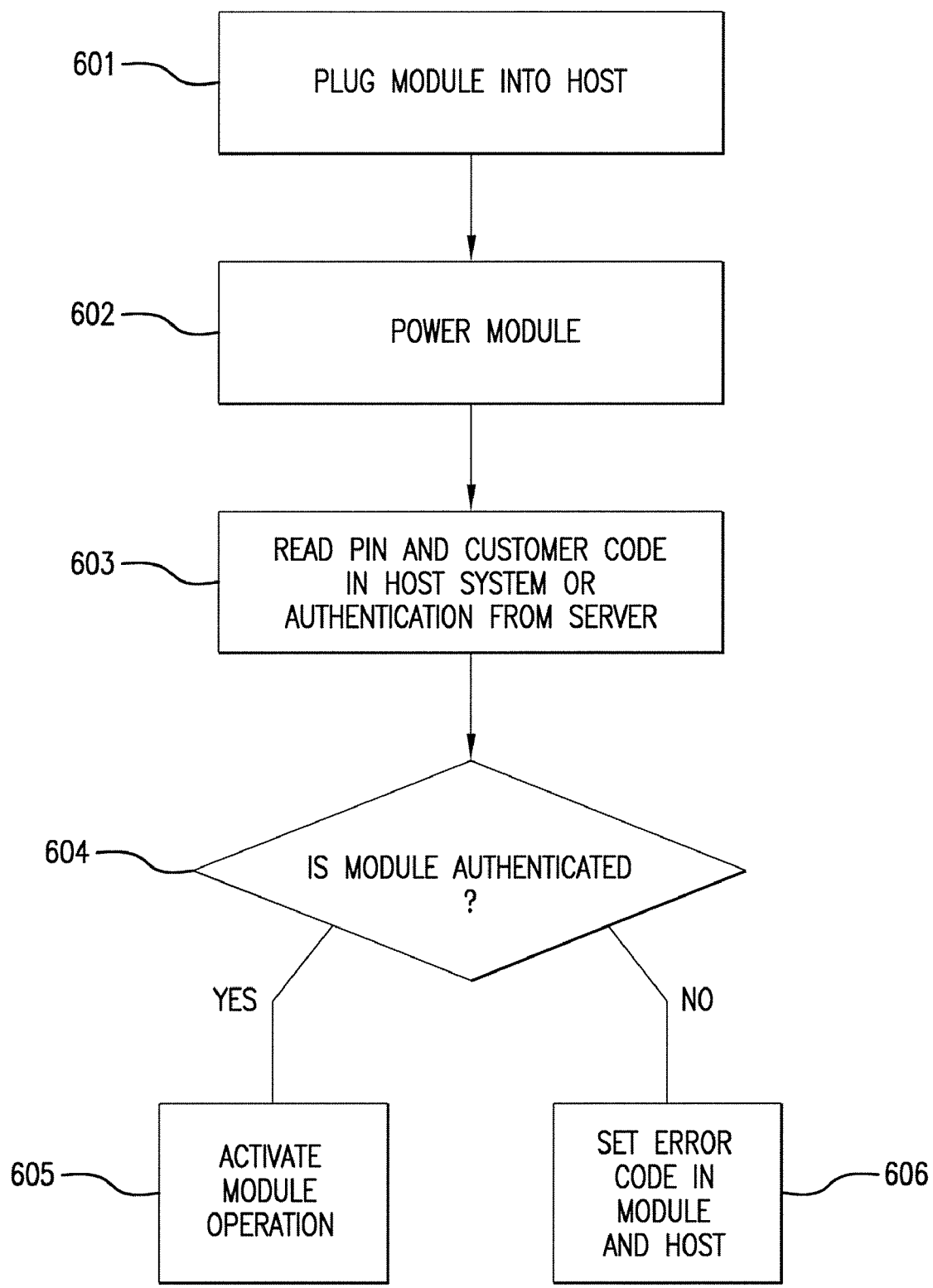
FIG. 6 is a flow chart depicting the activation and authentication of a module as it is plugged into a host unit.

FIG. 6 is a flow chart depicting the activation and authentication of a module as it is plugged into a host unit. The unit is plugged in at step 601, powered by the host unit at step 602 and the serial number, PIN, and/or customer code read from the module and processed by the host system at step 603. A processor 257 may be provided in the host unit which performs this function, or in larger networks the host unit may transfer the acquired data to a remote authentication server 406 or processor performing the authentication function.

As noted earlier, one of the concerns of network architects and managers, and vendors of network equipment and software, is the authenticity of network units, such as optoelectronic modules or transceivers. Since such units are small, portable, pluggable components, the use of unauthorized or counterfeit modules is a substantial concern, and difficult to detect. It is therefore one aspect of the present invention to utilize the stored data capability in the module intended for performance monitoring also for securely identifying the origin and capabilities of the module and to provide an authorization technique when the module is plugged into a host unit prior to operational activation of the module.

In one embodiment, after the module is plugged into the host unit, a data sequence including vendor information, unique serial number, and operational capabilities is sent over the host network to a network management unit or authorization server 406. One function of the network manager would be to verify the authenticity of such information. An unauthorized clone unit, for example, may be encoded with the same vendor name, serial number, etc. as an authorized unit that has been reversed engineered. The network manager may perform certain validity tests, such as for example, to see if the "unique" serial number has already been utilized by another genuine module connected to another host unit on the network. If the same serial number appears already in use, the network manager would conclude one of the attached modules is counterfeit, and deny authorization to the duplicate module. The denial of authorization may be performed in a number of different ways. A control signal may be sent to the host unit to shut off power to or communication with the module. The module itself may contain an internal authenticity circuit, which when activated by a control signal from the network manager, may permanently disable the module, requiring the user to return it to the vendor for analysis and repair. Alternatively, an alarm or report may be generated by the network manager and forwarded to the human network operator for personal action, or be transmitted over the Internet to a vendor of the module, for further investigation.

Figure 7:
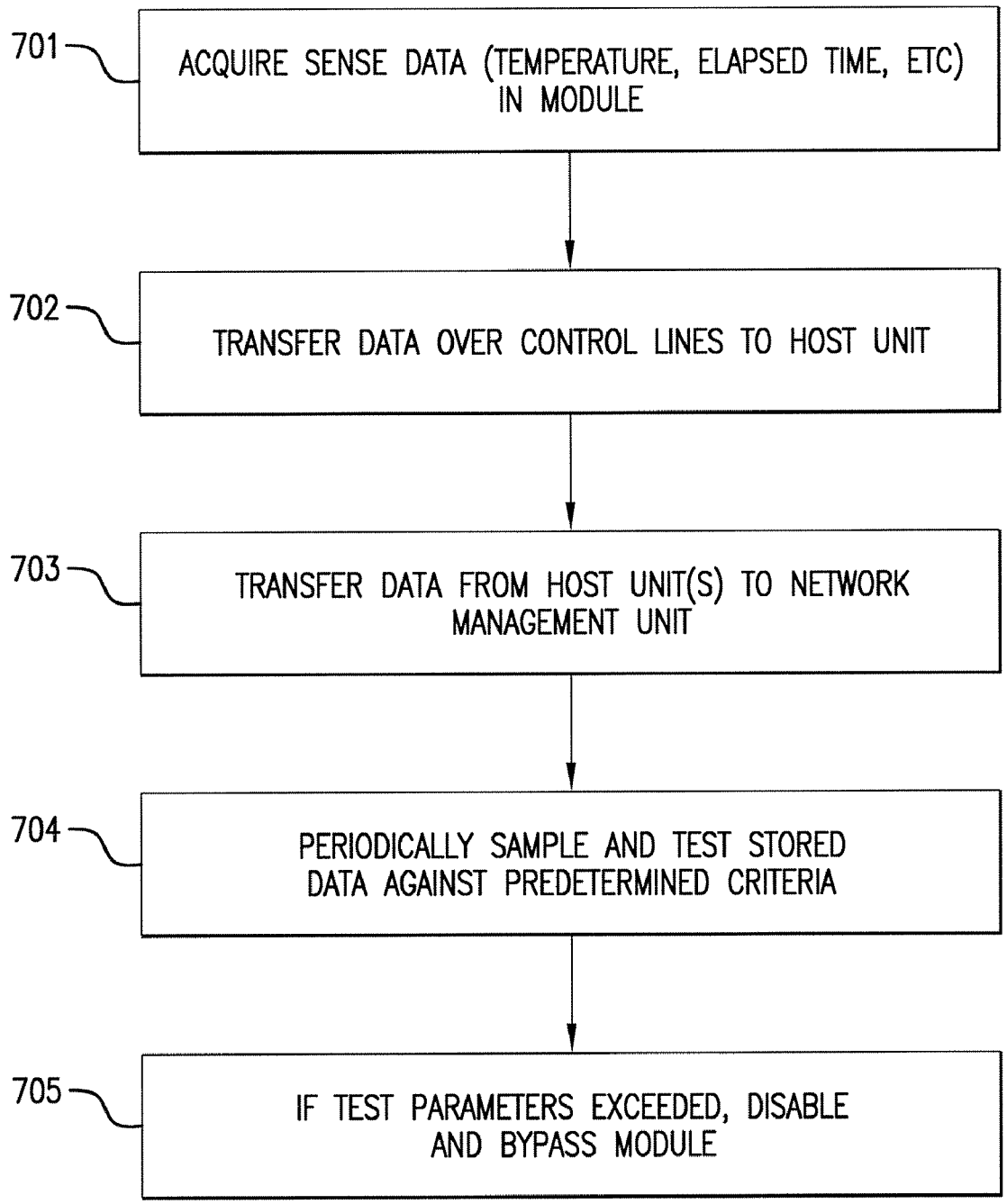
FIG. 7 is a flow chart depicting the acquisition and storage off module operational data as part of a network management system.

Another feature of the invention is set forth in the flow chart of FIG. 7 which describes one aspect of the network manager. At step 701, sensed data (such as temperature, elapsed time, etc.) is acquired in a module. At step 702, the acquired data is transferred from the module to the host unit. Since there may be multiple host units in the network, at step 703 the data is transferred from the host network to the network manager. Step 704 illustrates one of a variety of possible operations by the network manager on the acquired data in this embodiment; in this example, data is periodically sampled and compared against predetermined operational criteria. Such criteria may be used to determine if the module is operating within normal environmental and operational parameters, being subject to occasional stress which may affect reliability or lifetime. Step 705 illustrates an action of the network manager in the example of the predetermined criteria being exceeded by disabling the module (such as by switching off power), and bypassing the module's slot for subsequent data communications.

Various modifications and improvements of the present invention may also be apparent to those of ordinary skill in the art. Thus, the particular combination of parts described and illustrated herein is intended to represent only certain embodiments of the present invention, and is not intended to serve as limitations of alternate devices within the spirit and scope of the invention. Various aspects of the techniques and apparatus associated with the parametric signal processing aspect of the invention may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or web site which may be downloaded to the transmitter automatically or on demand. The foregoing techniques may be performed by, for example, a single central processor, a multiprocessor, on one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions, from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specifically designed application-specific integrated circuits (ASICS).

It will be understood that each of the elements described above, or two or more together, also may find a useful application in other types of constructions differing from the types described above.

While the invention has been illustrated and described as embodied in a module and network manager for an optical communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The invention claimed is:

1. An optoelectronic module for converting and coupling an information-containing electrical signal from an information system device with an optical fiber comprising:

a housing including an electrical connector for detachably coupling with an external information system device and for transmitting information-containing electrical signals over said connector, and a fiber optical connector adapted for coupling with an external optic fiber for transmitting an optical signal;

an electro-optic subassembly disposed in said housing for converting the electrical signal to a modulated optical signal corresponding to the electrical signals at a predetermined wavelength;

a memory disposed in said housing for storing a unique identifier for the optoelectronic module; and communication interface means disposed in said housing for electrically transferring said unique identifier for the optoelectronic module to said external information system device for receiving an authorization response from said external information system device to enable operation of the module when it is determined by the external information system device that there are no other module having the same unique identifier, and for receiving a signal to shut off power to or communication with the optoelectronic module when it is determined by the external information system device that there is another module having the same unique identifier.

2. The module of claim 1, further comprising parametric collection means disposed in said housing for collecting operational data associated with the module.

3. The module of claim 2, wherein said parametric collection means records the temperature of the housing.

4. The module of claim 3, wherein said parametric collection means records the time rate of change of the temperature of the housing.

5. The module of claim 2, wherein said parametric collection means records a temperature of a laser or light emitting diode within the housing.

6. The module of claim 5, wherein said parametric collection means records a time rate of change of the temperature of the laser or light emitting diode.

7. The module of claim 2, wherein the communication interface means is a circuit connected to said electrical connector for transferring said operational data to said information system device for storage therein.

8. The module of claim 2, wherein said parametric collection means records the total operating time of the optoelectronic module.

9. The module of claim 1, further comprising a network operating system associated with said information system device for polling said module.

10. The module of claim 1, wherein said unique identifier is a serial number for said optoelectronic module.

11. In a data communications network including a plurality of network units and a plurality of pluggable optoelectronic modules coupled to one or more of such network units, the modules functioning to couple the associated network unit to an optical fiber for transmitting and/or receiving optical signals over such fiber, each module having a unique electronic identifier that is selectable from a set of identifiers and is utilized by the network to activate such module when the module is plugged into the network unit, the data communications network comprising:

an optoelectronic module including a processor disposed in the module for detecting when said module is plugged into the network unit and transmitting the identifier associated with said module included with an authorization request to the network unit and for receiving an authorization response from the network unit; and an encryption based authenticator for processing said authorization request for determining whether the module is authorized to operate with said network unit, wherein said authenticator is configured to determine whether the identifier associated with said module is already in use by another module in the data communication network and to deny said authorization request when it is determined that the identifier is already in use by said another module.

12. The module of claim 11, further comprising sensors disposed in said module for collecting operational data associated with the module, wherein said processor is configured to compress the operational data for storage in the module.

13. The module of claim 11, wherein said processor is configured to transmit data representing operational capabilities of the module to the network unit.

14. The module of claim 11, wherein said one or more of such network units are configured to shut off power to or communication with the module when it is determined that the module is not authorized to operate.

* * * * *